(12) United States Patent
Iwata

(10) Patent No.: US 10,936,158 B2
(45) Date of Patent: Mar. 2, 2021

(54) INFORMATION PROCESSING DEVICE AND NON-TRANSITORY COMPUTER READABLE MEDIUM

(71) Applicant: FUJI XEROX CO., LTD., Tokyo (JP)

(72) Inventor: Masahiro Iwata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/211,587

(22) Filed: Dec. 6, 2018

(65) Prior Publication Data

US 2019/0107928 A1    Apr. 11, 2019

Related U.S. Application Data

(63) Continuation of application No. 14/597,742, filed on Jan. 15, 2015, now Pat. No. 10,180,770.

(30) Foreign Application Priority Data

Aug. 6, 2014 (JP) .................................. 2014-160656

(51) Int. Cl.
　　*G06F 3/048*　　(2013.01)
　　*G06F 3/0482*　　(2013.01)
　　*G06F 3/0484*　　(2013.01)

(52) U.S. Cl.
　　CPC .......... *G06F 3/0482* (2013.01); *G06F 3/0484* (2013.01)

(58) Field of Classification Search
　　None
　　See application file for complete search history.

(56) References Cited

U.S. PATENT DOCUMENTS

| | | | |
|---|---|---|---|
| 2004/0004738 A1* | 1/2004 | Ikeda | G06F 3/1208 358/1.15 |
| 2005/0114696 A1* | 5/2005 | Hashimoto | G06F 21/31 726/26 |
| 2006/0023246 A1* | 2/2006 | Vidyanand | G06F 3/1204 358/1.13 |
| 2008/0038032 A1 | 2/2008 | Suzue | |

(Continued)

FOREIGN PATENT DOCUMENTS

| CN | 102884497 A | 1/2013 |
|---|---|---|
| JP | 2008-44158 A | 2/2008 |

(Continued)

OTHER PUBLICATIONS

Communication dated Mar. 27, 2018 from the Japanese Patent Office in counterpart Application No. 2014-160656.

(Continued)

*Primary Examiner* — William C Trapanese

(74) *Attorney, Agent, or Firm* — Sughrue Mion, PLLC

(57) ABSTRACT

An information processing device includes a display and a controller. The display displays a setting screen containing a display element representing a setting item. The controller exerts control in such a manner that, in the case where a service is not introduced in the information processing device, the display element is displayed in a first manner, and exerts control in such a manner that, in the case where a service is introduced in the information processing device and where the setting item is not a setting item to be set for use of the service, the display element is displayed in a second manner. The second manner is different from the first manner.

4 Claims, 16 Drawing Sheets

(56) References Cited

U.S. PATENT DOCUMENTS

| | | | |
|---|---|---|---|
| 2010/0188700 A1* | 7/2010 | Fujimori | ............... G06F 3/1256 358/1.15 |
| 2011/0161881 A1 | 6/2011 | Tomita et al. | |
| 2011/0276918 A1 | 11/2011 | Bennett | |
| 2013/0111410 A1 | 5/2013 | Okada et al. | |

FOREIGN PATENT DOCUMENTS

| | | |
|---|---|---|
| JP | 2010-79348 A | 4/2010 |
| JP | 2012-141977 A | 7/2012 |
| JP | 2012-168793 A | 9/2012 |
| JP | 2011-139393 A | 7/2014 |
| JP | 2014-128009 A | 7/2014 |

OTHER PUBLICATIONS

Communication dated Apr. 3, 2018 from the State Intellectual Property Office of the P.R.C. in counterpart Application No. 201510096971.5.

\* cited by examiner

FIG. 7

| SELECT ITEM | |
|---|---|
| SMTP | CANCEL  SUBMIT |

SMTP SERVER NAME/ADDRESS  [          ]

SMTP SERVER PORT NUMBER  [ 25 ]

POP3 SERVER NAME/ADDRESS  [          ]

POP3 SERVER PORT NUMBER  [ 110 ]

[ AUTHENTICATION FOR SMTP TRANSMISSION ▽ ]

☐ APOP AUTHENTICATION

[ ADDRESS OF MAIL SENDER ▽ ]

FIG. 11

| SELECT ITEM | |
|---|---|
| SMTP | CANCEL  SUBMIT |

SMTP SERVER NAME/ADDRESS  [         ]

SMTP SERVER PORT NUMBER  [ 25 ]

POP3 SERVER NAME/ADDRESS  [         ]

POP3 SERVER PORT NUMBER  [ 110 ]

[ AUTHENTICATION FOR SMTP TRANSMISSION ▽ ]

☐ APOP AUTHENTICATION

[ ADDRESS OF MAIL SENDER ▽ ]

FIG. 13A

| SERVICE | SETTING ITEM |
|---|---|
| SERVICE A | SMTP SERVER NAME/ADDRESS |
| | SMTP SERVER PORT NUMBER |
| | POP3 SERVER NAME/ADDRESS |
| | POP3 SERVER PORT NUMBER |
| | ... |
| | ... |
| SERVICE B | ... |
| | ... |
| ... | ... |

FIG. 13B

| SERVICE | CLASSIFICATION | | | SETTING ITEM |
| | CLASSIFICATION 1 | CLASSIFICATION 2 | CLASSIFICATION 3 | |
|---|---|---|---|---|
| SERVICE A | NETWORK SETTING | PROTOCOL SETTING | SMTP | SMTP SERVER NAME/ADDRESS |
| | | | | SMTP SERVER PORT NUMBER |
| | | | | POP3 SERVER NAME/ADDRESS |
| | | | | POP3 SERVER PORT NUMBER |
| | | | | ... |
| | | | | ... |
| SERVICE B | ... | ... | ... | ... |
| | ... | ... | ... | ... |
| ... | ... | ... | ... | ... |

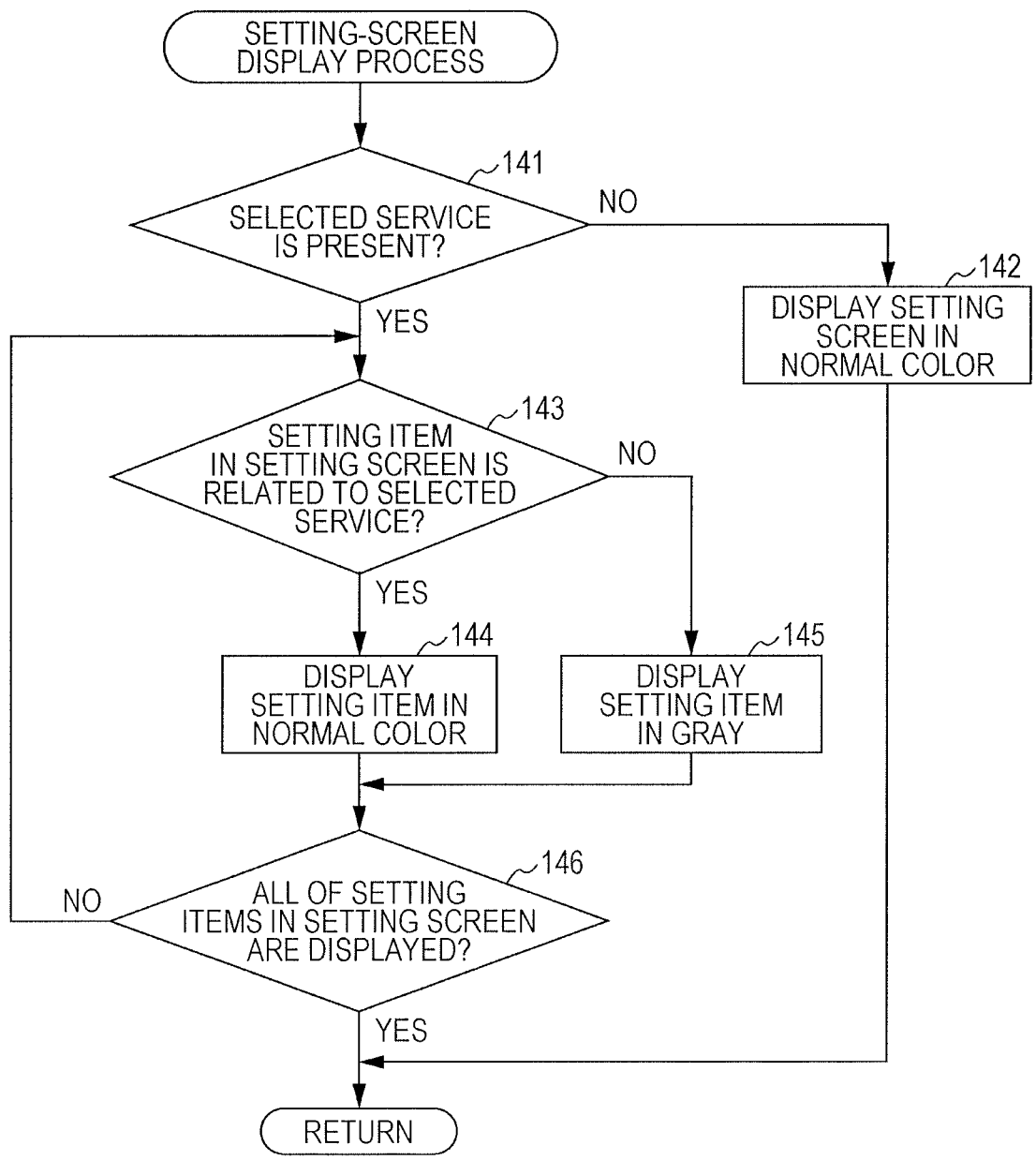

INFORMATION PROCESSING DEVICE AND NON-TRANSITORY COMPUTER READABLE MEDIUM

CROSS-REFERENCE TO RELATED APPLICATIONS

This application is a Continuation of U.S. application Ser. No. 14/597,742 filed Jan. 15, 2015, which is based on and claims priority under 35 USC 119 from Japanese Patent Application No. 2014-160656 filed Aug. 6, 2014, the disclosures of which are incorporated herein by reference in their entireties.

BACKGROUND

Technical Field

The present invention relates to an information processing device and a non-transitory computer readable medium.

SUMMARY

According to an aspect of the invention, there is provided an information processing device including a display and a controller. The display displays a setting screen containing a display element representing a setting item. The controller exerts control in such a manner that, in the case where a service is not introduced in the information processing device, the display element is displayed in a first manner, and exerts control in such a manner that, in the case where a service is introduced in the information processing device and where the setting item is not a setting item to be set for use of the service, the display element is displayed in a second manner. The second manner is different from the first manner.

BRIEF DESCRIPTION OF THE DRAWINGS

Exemplary embodiments of the present invention will be described in detail based on the following figures, wherein:

FIG. 7 is a diagram illustrating an exemplary simple mail transfer protocol (SMTP) setting screen displayed when no services are installed;

FIG. 11 is a diagram illustrating an exemplary SMTP setting screen displayed when services are installed;

FIGS. 13A and 13B are diagrams illustrating exemplary service-related information stored in a service-related-information storage unit;

FIG. 16 is a flowchart of an exemplary operation performed by the setting support device when a setting screen is to be displayed.

DETAILED DESCRIPTION

Referring to the accompanied drawings, an exemplary embodiment of the present invention will be described in detail below.

Hardware Configuration of Image Processing Apparatus

Figure 1:
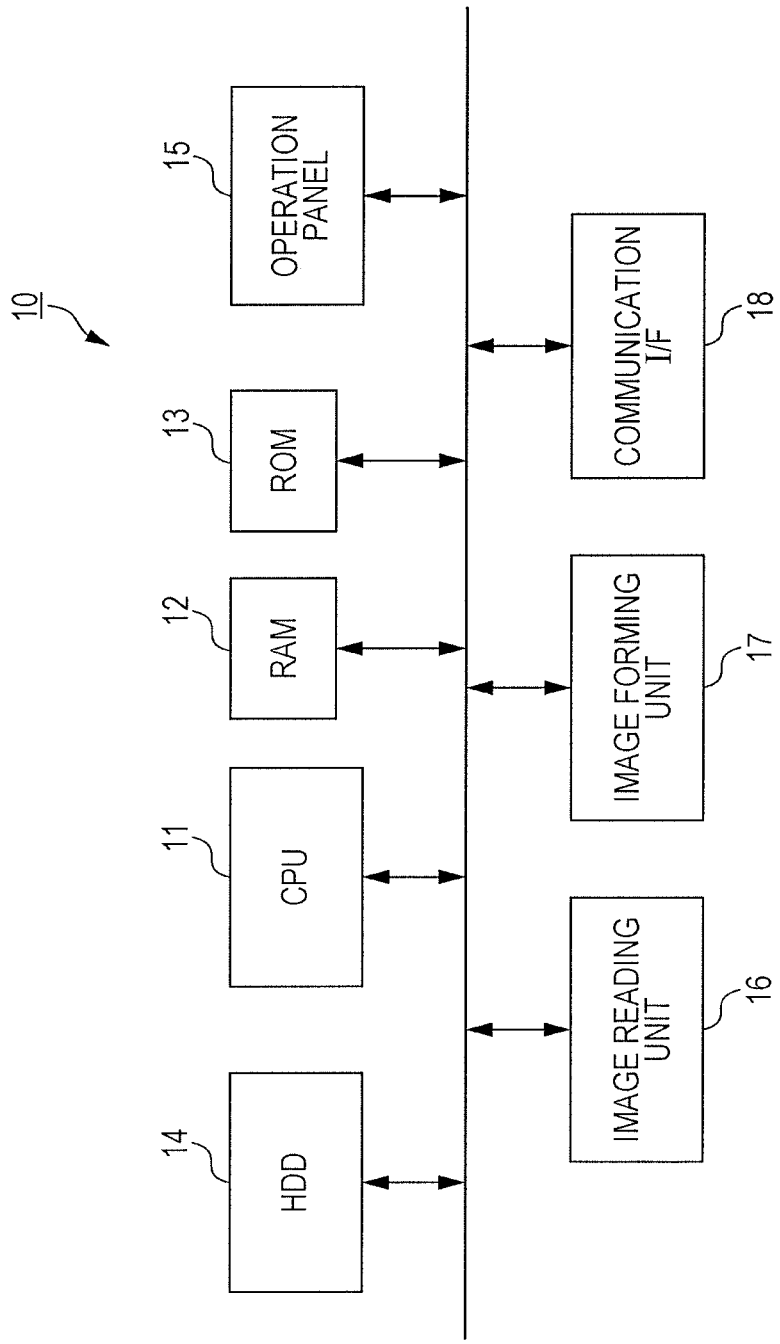
FIG. 1 is a diagram illustrating an exemplary hardware configuration of an image processing apparatus according to an exemplary embodiment of the present invention.

FIG. 1 is a diagram illustrating an exemplary hardware configuration of an image processing apparatus 10 according to the present exemplary embodiment. As illustrated in FIG. 1, the image processing apparatus 10 includes a central processing unit (CPU) 11, a random access memory (RAM) 12, a read only memory (ROM) 13, a hard disk drive (HDD) 14, an operation panel 15, an image reading unit 16, an image forming unit 17, and a communication interface (hereinafter referred to as a "communication I/F") 18.

The CPU 11 achieves functions described below, by loading various programs stored in the ROM 13 or the like to the RAM 12 and executing the programs.

The RAM 12 is a memory used as a work memory or the like of the CPU 11.

The ROM 13 is a memory for storing the various programs or the like executed by the CPU 11.

The HDD 14 is, for example, a magnetic disk unit which stores image data read by the image reading unit 16, image data used for image formation performed by the image forming unit 17, and the like.

The operation panel 15 is an exemplary display, and is, for example, a touch panel which displays various types of information and which receives an operation input from a user. The operation panel 15 includes a display unit on which various types of information are displayed, and a position detection sheet which detects the position specified by using a finger, a stylus pen, or the like. Instead of a touch panel, a display unit and a keyboard may be used.

The image reading unit 16 reads an image recorded on a recording medium such as paper. The image reading unit 16 is, for example, a scanner for which the charge coupled device (CCD) system or a contact image sensor (CIS) system may be used. In the CCD system, light produced by reflecting light emitted from a light source to a document is reduced through a lens and is received by CCDs. In the CIS system, light produced by reflecting light emitted sequentially from light-emitting diode (LED) light sources to a document is received by a CIS.

The image forming unit 17 forms an image on a recording medium. The image forming unit 17 is, for example, a printer for which the electrophotographic system or the ink jet system may be used. In the electrophotographic system, an image is formed by transferring toner attached to a photoconductor, to a recording medium. In the ink jet system, an image is formed by ejecting ink onto a recording medium.

The communication I/F 18 receives/transmits various types of information from/to another apparatus via a communication line.

Background of Exemplary Embodiment

Multiple services may be installed in the image processing apparatus 10 having this configuration, and may be operated. Such services have various setting items in order that the apparatus or the services perform an operation desired by a user, in accordance with the operating environment, an operating method, or the like.

A service installed in the image processing apparatus 10 may have setting items specific to the service so that the function provided by the service performs a desired operation. In contrast, in the image processing apparatus 10, multiple setting items for which settings available in common to services are set (hereinafter referred to as "common setting items in services") are used besides the service-specific setting items.

Figure 2:
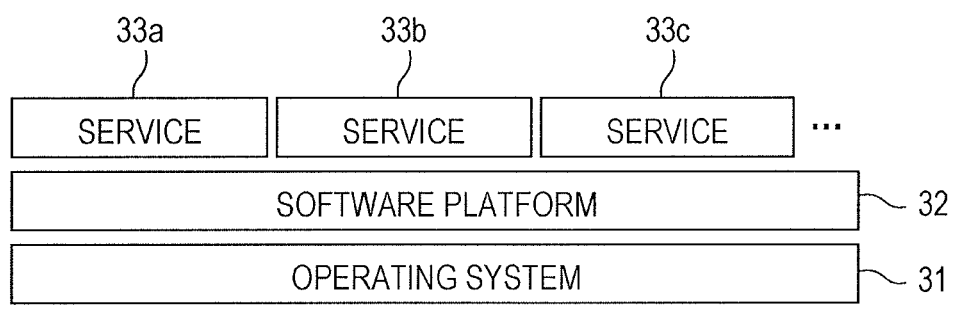
FIG. 2 is a diagram illustrating an exemplary software configuration of the image processing apparatus according to the exemplary embodiment of the present invention.

FIG. 2 is a diagram illustrating an exemplary software configuration of the image processing apparatus 10. As illustrated in FIG. 2, a software platform 32 operates on an operating system 31, and services 33*a*, 33*b*, 33*c*, etc. operate on the software platform 32. The operating system 31 is, for example, Linux® or iOS®. The software platform 32 is a mechanism for implementing the services 33*a*, 33*b*, 33*c*, etc. easily. Specifically, the software platform 32 provides processing control, authentication control, system setting, and the like, and uses these functions to implement the services 33*a*, 33*b*, 33*c*, etc. on the software platform 32. The common setting items in services are provided in the software platform 32.

Typically, all of the setting items specific to each of the services are set by preparing a screen which is specific to the service and which is used to set the setting items. Examples of setting items specific to a drawing-difference detection service in which drawings before and after change are compared with each other and in which the difference is detected include setting of a color used to make markings for the detected difference, and setting of a frame surrounding a portion in which the difference is detected. These types of setting which are performed as setting for the drawing-difference detection service are performed without confusion.

In contrast, for the common setting items in services, in order to enable desired setting items to be easily retrieved from various setting items and to be set, classified and hierarchized setting screens are prepared as common setting screens which are not specific to a service. Thus, a user searches for setting items necessary for use of the apparatus or the services, by using the classification and the hierarchization, and sets setting values according to the purpose of use.

Actually, setting items related to a service to be used are limited. That is, it is not necessary to set all of the setting items provided in the image processing apparatus 10. In other words, a setting item necessary for the operation of a service may be unnecessary for the operation of another service. As a matter of course, a setting item may be necessary for both of the services. Determination as to which setting item is related to a desired service fails to be made only from the setting screens. For example, the setting items which are common in services and which are related to the drawing-difference detection service include setting of the mail transmission environment and setting of the authentication mode. These are setting items necessary in the drawing-difference detection service. When these setting items are not set, a desired operation result fails to be obtained. In contrast, there is a service which does not need these setting items. In such a service, even when the setting items are not set, an expected operation is obtained. As a matter of course, there may be a service for which these setting items need to be set. However, there is no way of obtaining, only from the setting screens, information indicating which setting screen among common setting screens is related to the desired service.

Herein, a "service" refers to a function provided by the image processing apparatus 10 for a user by using hardware or software. Examples of services provided typically by using hardware include copying, scanning, printing, and faxing. Examples of services provided typically by using software include character recognition, format conversion, and detection of the difference between drawings. However, the present invention is not limited to these.

Herein, to "install" may be regarded as introduction of a service which is initially installed in the image processing apparatus 10, or may be regarded as introduction of a new service in addition to services which have been initially introduced in the image processing apparatus 10.

Herein, when a "setting item" is described as a target to be displayed, the "setting item" refers to a display element representing the setting item. The display element is an object on a screen, such as a button or a text box.

Overview of Operation Performed when No Services are Installed

Screen display and operations on screens which are performed when the common setting items in services are to be set in the case where no services are installed will be described below. The description will be made by taking a case in which setting for the simple mail transfer protocol (SMTP) is performed, as an example.

Figure 3:
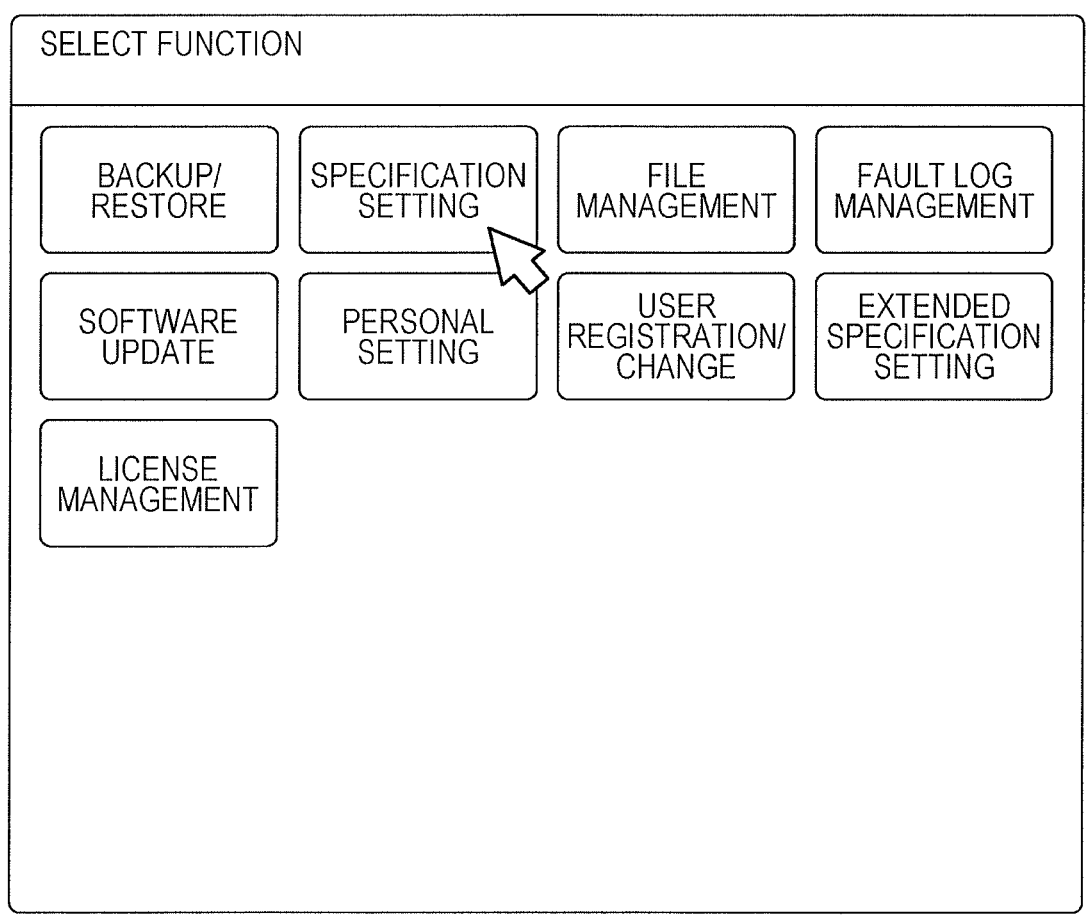
FIG. 3 is a diagram illustrating an exemplary menu screen.

FIG. 3 is a diagram illustrating an exemplary menu screen. For example, when the image processing apparatus 10 is started, the image processing apparatus 10 displays the menu screen. When the menu screen is displayed, a user uses "specification setting" to set setting items provided for the image processing apparatus 10. Services installed in the image processing apparatus 10 perform expected operations by using the settings in the setting items. The user presses a "specification setting" button on the menu screen, as illustrated by using the pointer in FIG. 3.

Figure 4:
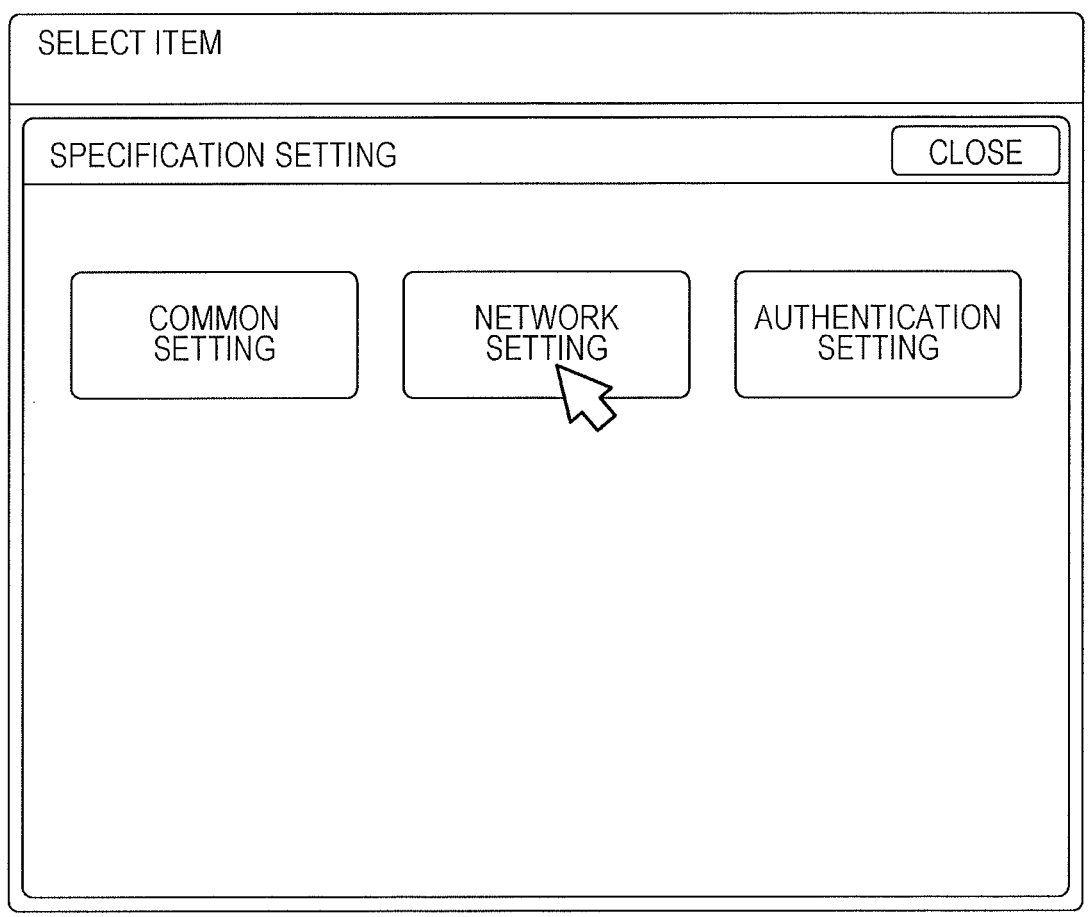
FIG. 4 is a diagram illustrating an exemplary specification setting screen displayed when no services are installed.

FIG. 4 is a diagram illustrating an exemplary specification setting screen. When the user presses the "specification setting" button on the menu screen as described above, the image processing apparatus 10 displays the specification setting screen. The user presses a "network setting" button for which the SMTP which is the target setting item is classified, as illustrated by using the pointer in FIG. 4.

Figure 5:
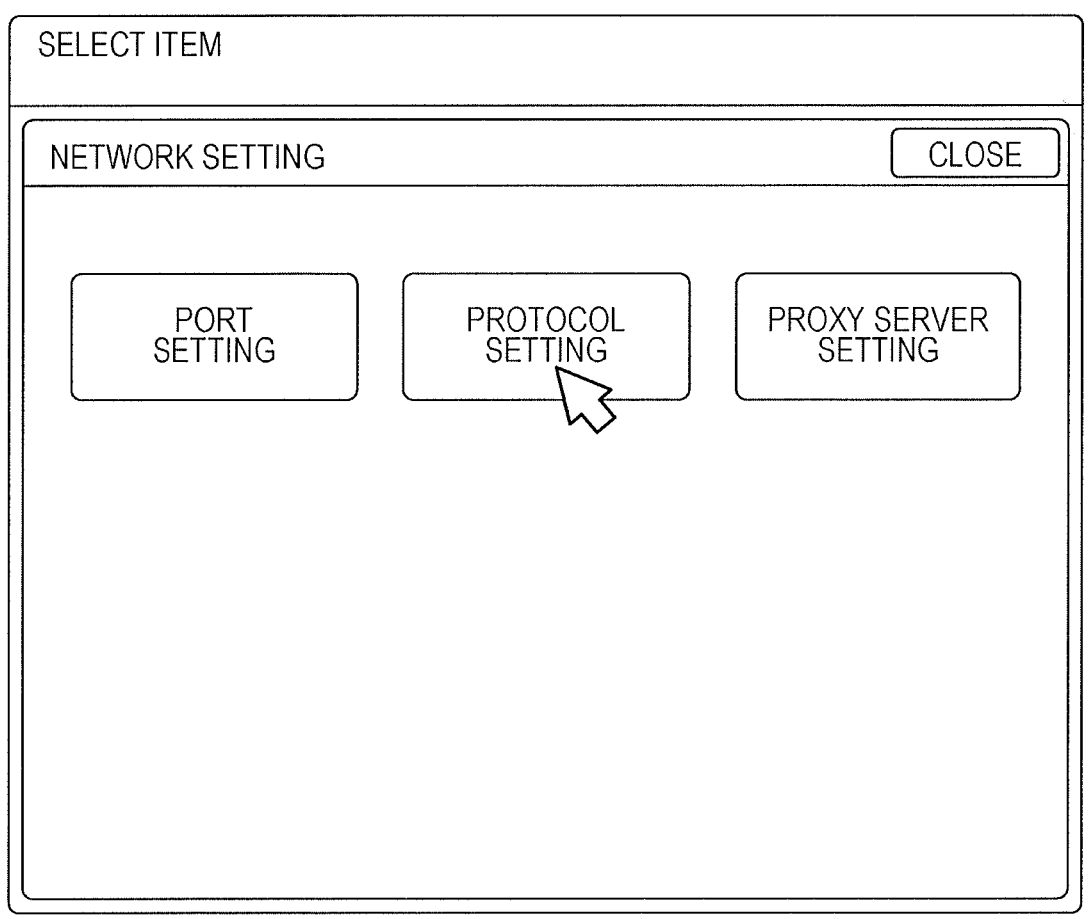
FIG. 5 is a diagram illustrating an exemplary state generated in the case where no services are installed and where a "network setting" button is selected in the specification setting screen.

FIG. 5 is a diagram illustrating an exemplary network setting screen. When the user presses the "network setting" button on the specification setting screen as described above, the image processing apparatus 10 displays the network setting screen. The user presses a "protocol setting" button for which the SMTP is classified, as illustrated by using the pointer in FIG. 5.

Figure 6:
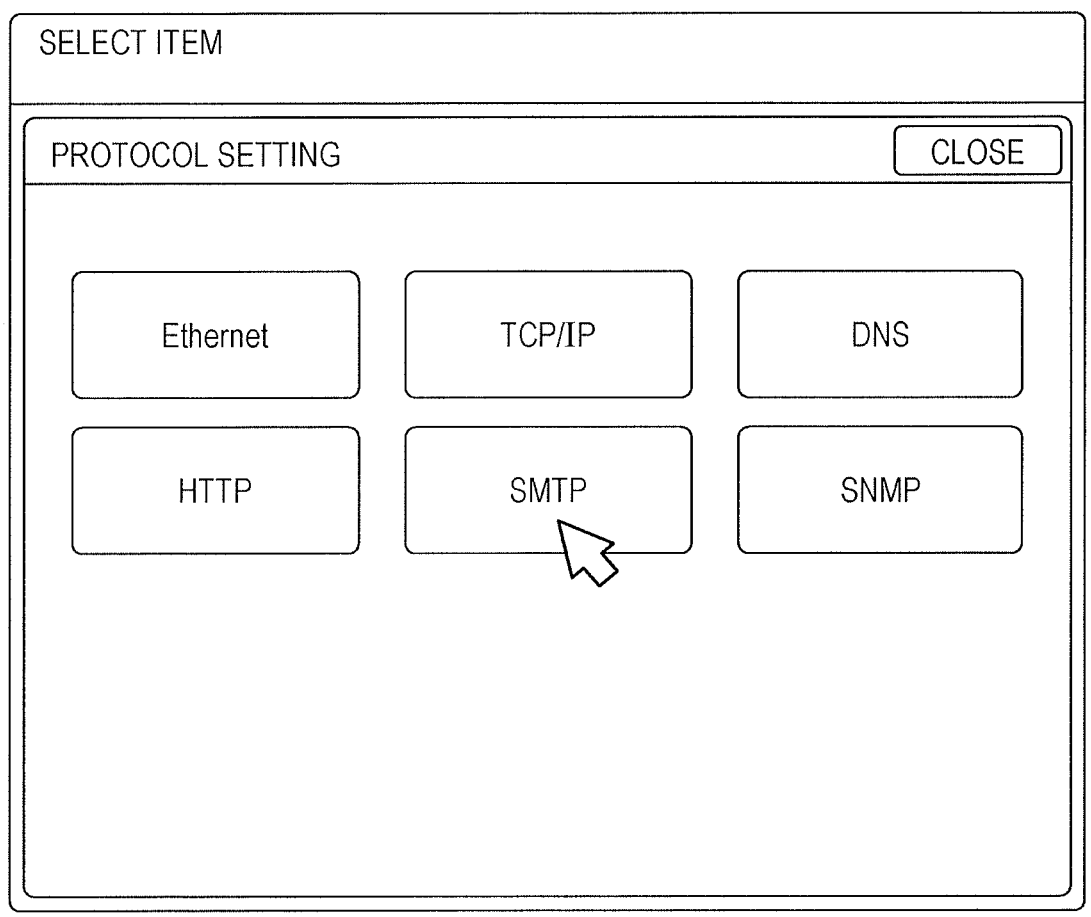
FIG. 6 is a diagram illustrating an exemplary protocol setting screen displayed when no services are installed.

FIG. 6 is a diagram illustrating an exemplary protocol setting screen. When the user presses the "protocol setting" button on the network setting screen as described above, the image processing apparatus 10 displays the protocol setting screen. If this example is an example in which all of the setting items are normally displayed even when services are installed, determination as to which setting item is one related to the desired service fails to be made in the protocol setting screen. The user presses an "SMTP" button corresponding to the target setting item, on the protocol setting screen, as illustrated by using the pointer in FIG. 6.

FIG. 7 is a diagram illustrating an exemplary SMTP setting screen. When the user presses the "SMTP" button on the protocol setting screen as described above, the image processing apparatus 10 displays the SMTP setting screen. Thus, the user performs SMTP setting on the SMTP setting screen.

Overview of Operation Performed when Services are Installed

Screen display and operation on screens which are performed when the common setting items in services are to be set in the case where services are installed will be described below. The description will be made by taking a case in which setting for the SMTP is performed, as an example.

For example, when the image processing apparatus 10 is started, the image processing apparatus 10 displays the menu screen illustrated in FIG. 3. The user presses the "specification setting" button on the menu screen, as illustrated by using the pointer in FIG. 3.

Figure 8:
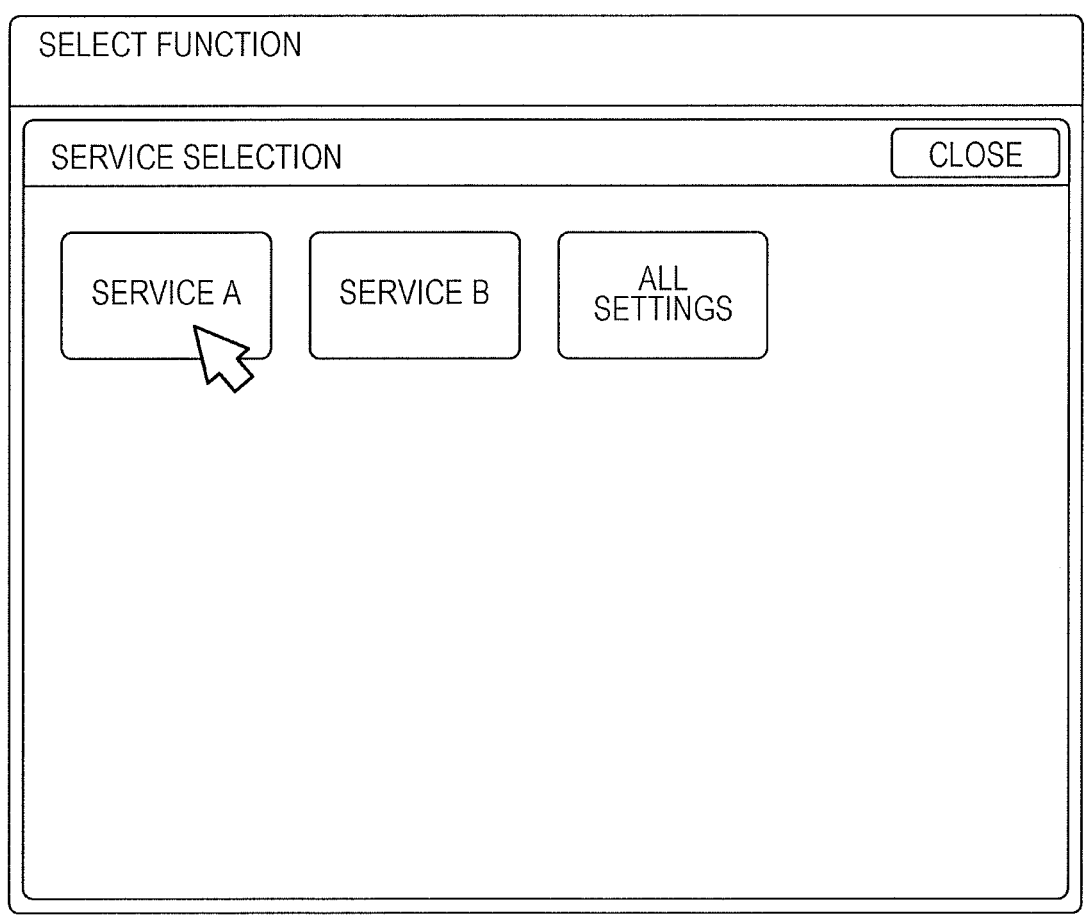
FIG. 8 is a diagram illustrating an exemplary service selection screen.

FIG. 8 is a diagram illustrating an exemplary service selection screen. When the user presses the "specification setting" button on the menu screen as described above, the image processing apparatus 10 displays the service selection screen. The service selection screen is displayed so that installed services are selectable. The service selection screen contains an "all settings" button which enables all of the setting items to be set regardless of the installed services. The user presses a "service A" button representing a service to be set, on the service selection screen, as illustrated by using the pointer in FIG. 8.

Figure 9:
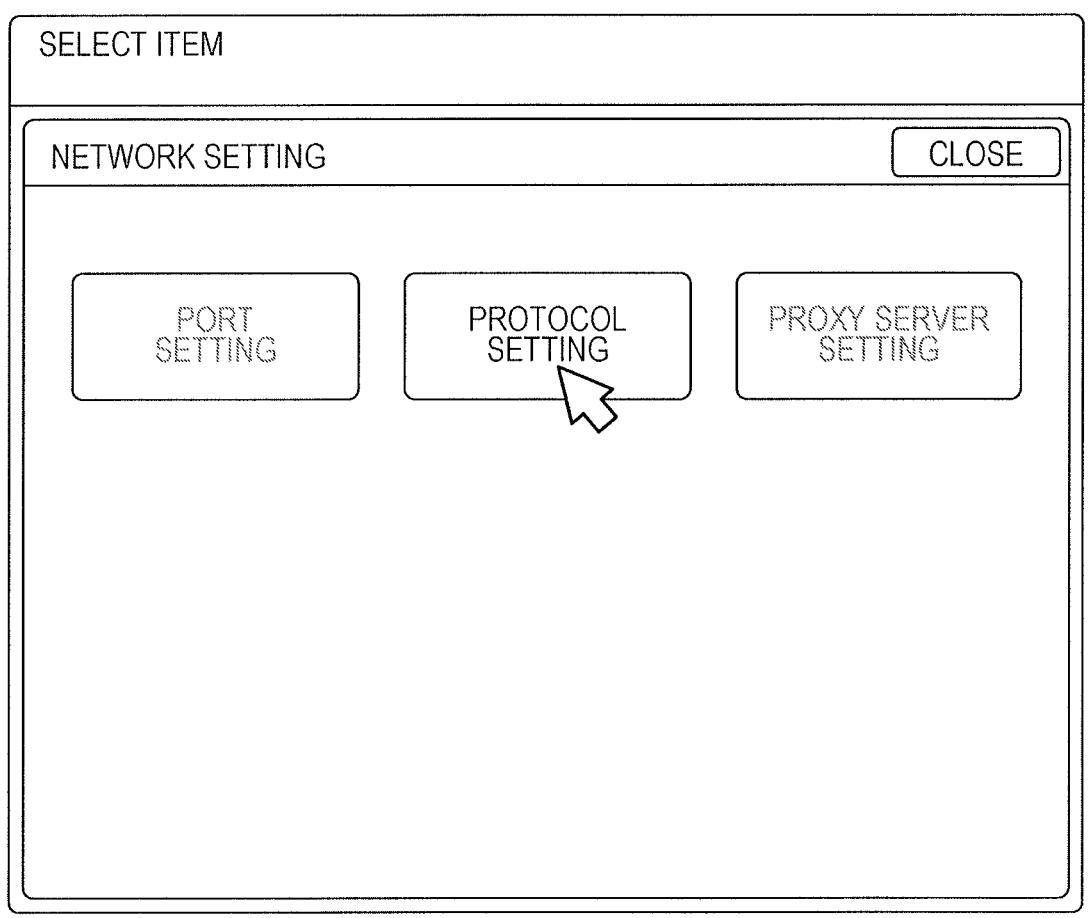
FIG. 9 is a diagram illustrating an exemplary network setting screen displayed when services are installed.

FIG. 9 is a diagram illustrating an exemplary network setting screen. When the user presses the "service A" button on the service selection screen as described above, the image processing apparatus 10 displays the specification setting screen. When the user presses the "network setting" button on the specification setting screen, the image processing apparatus 10 displays the network setting screen. In the network setting screen, setting items related to the service A to be set are displayed by using a normal color, and other setting items are displayed by using gray. Thus, the user may reach the setting item that needs to be set, without hesitation. After that, the user presses the "protocol setting" button for which the SMTP is classified, on the network setting screen, as illustrated by using the pointer in FIG. 9.

Figure 10:
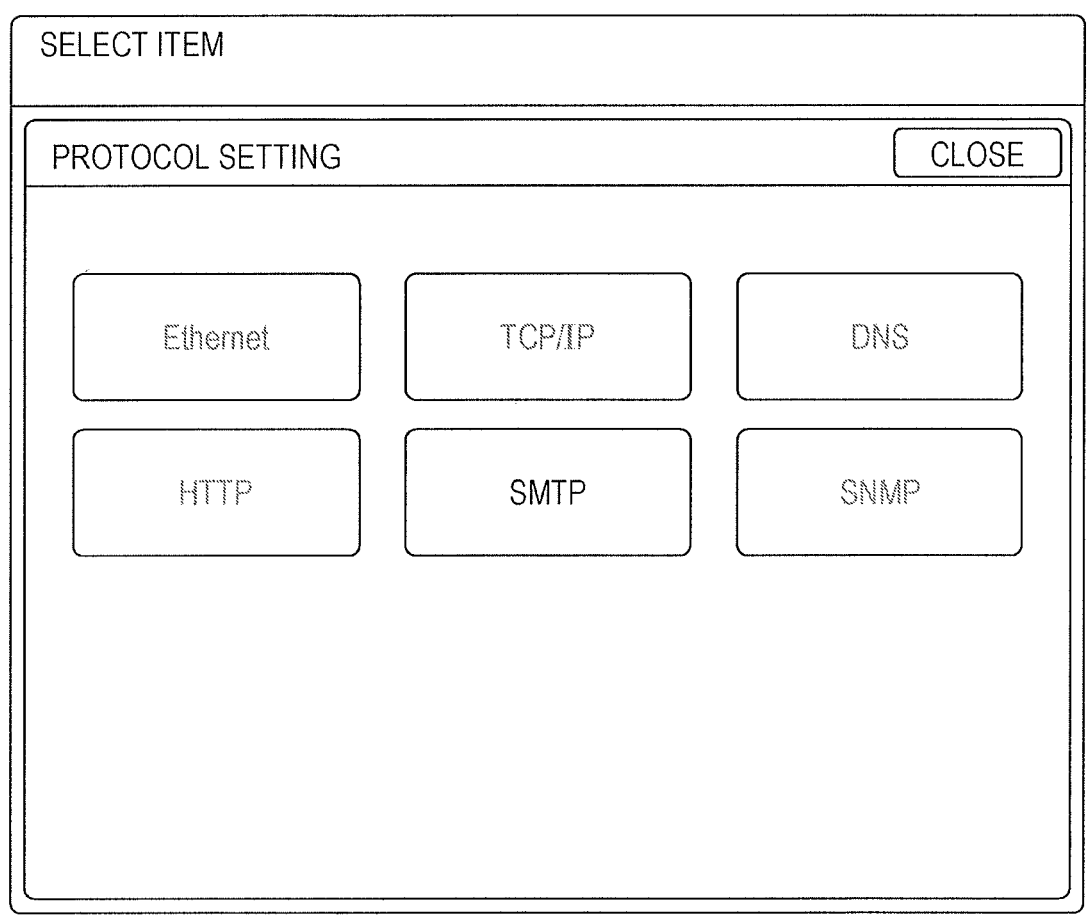
FIG. 10 is a diagram illustrating an exemplary protocol setting screen displayed when services are installed.

FIG. 10 is a diagram illustrating an exemplary protocol setting screen. When the user presses the "protocol setting" button on the network setting screen as described above, the image processing apparatus 10 displays the protocol setting screen. In the protocol setting screen, setting items related to the service A to be set are displayed by using the normal color, and the other setting items are displayed by using gray. Thus, the user may reach the setting item that needs to be set, without hesitation. After that, the user presses the "SMTP" button corresponding to the target setting item, on the protocol setting screen, as illustrated by using the pointer in FIG. 10.

FIG. 11 is a diagram illustrating an exemplary SMTP setting screen. When the user presses the "SMTP" button on the protocol setting screen as described above, the image processing apparatus 10 displays the SMTP setting screen. In the SMTP setting screen, setting items related to the service A to be set are displayed by using the normal color, and the other setting items are displayed by using gray. Thus, the user may reach the setting items that need to be set, without hesitation, and may set all of the setting items to be set.

Functional Configuration of Setting Support Device

Figure 12:
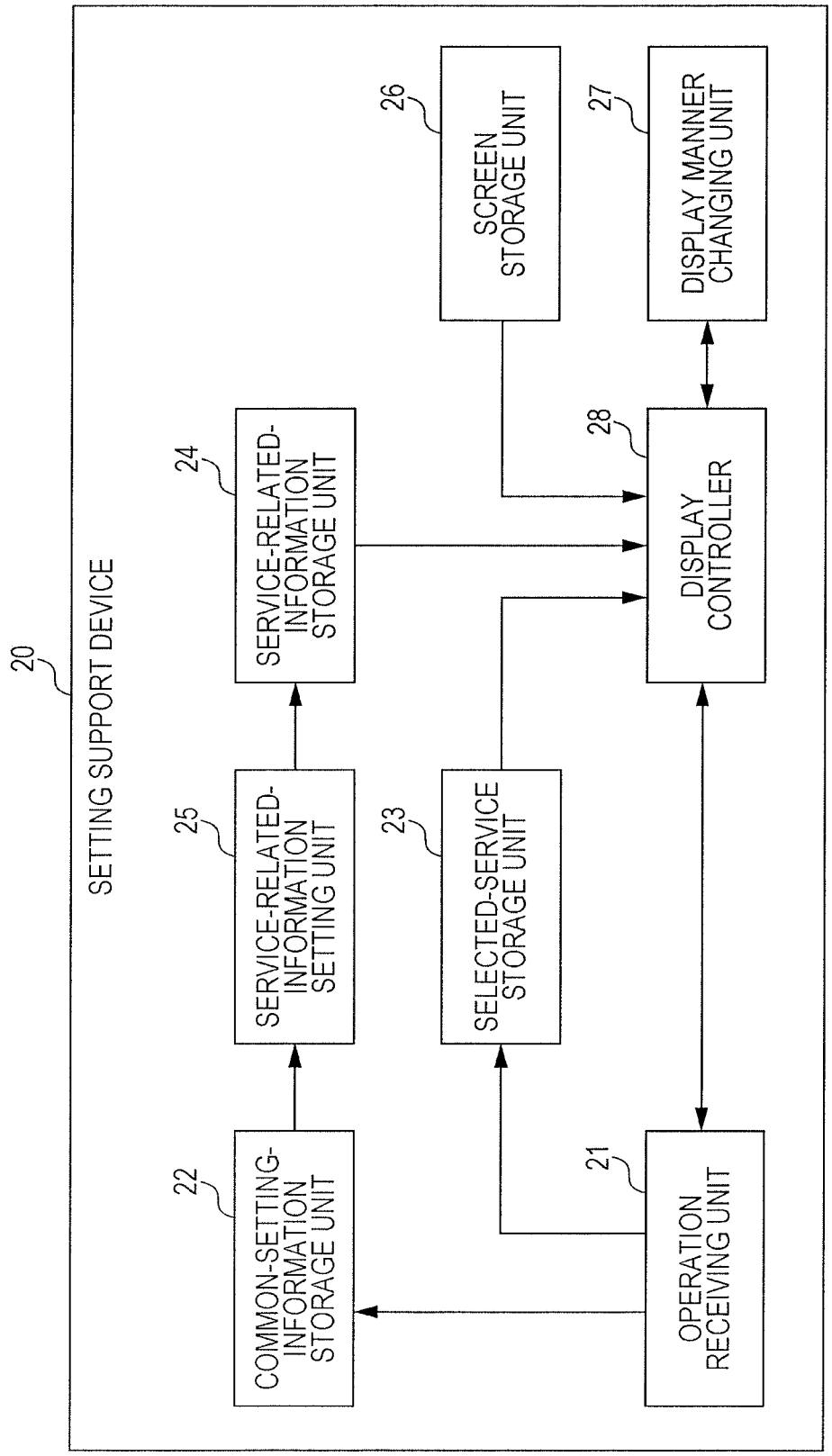
FIG. 12 is a block diagram illustrating an exemplary functional configuration of a setting support device according to the exemplary embodiment of the present invention.

FIG. 12 is a block diagram illustrating an exemplary functional configuration of a setting support device 20 operating the above-described operations. The setting support device 20 is an exemplary information processing device, and is regarded as a device implemented in such a manner that the CPU 11 (see FIG. 1) of the image processing apparatus 10 reads programs for achieving functional units described below, for example, from the ROM 13 (see FIG. 1) to the RAM 12 (see FIG. 1) and executes them.

As illustrated in FIG. 12, the setting support device 20 includes an operation receiving unit 21, a common-setting-information storage unit 22, a selected-service storage unit 23, a service-related-information storage unit 24, a service-related-information setting unit 25, a screen storage unit 26, a display manner changing unit 27, and a display controller 28.

The operation receiving unit 21 receives a user operation performed on the operation panel 15 (see FIG. 1). In particular, when a user operation for setting a setting value to a common setting item in services so as to cause a service to perform a desired operation is received, the operation receiving unit 21 outputs information indicating this to the common-setting-information storage unit 22. When a user operation for selecting a desired service from the services installed in the image processing apparatus 10 is received, the operation receiving unit 21 outputs information indicating this to the selected-service storage unit 23. When a user operation for displaying any of the setting screens stored in the screen storage unit 26 is received, the operation receiving unit 21 outputs information indicating this to the display controller 28. In the present exemplary embodiment, the operation receiving unit 21 is provided as an exemplary receiving unit which receives a selection operation for selecting a service.

When the common-setting-information storage unit 22 receives information indicating a user operation for setting a setting value to a common setting item in services so as to cause a service to perform a desired operation, from the operation receiving unit 21, the common-setting-information storage unit 22 stores common setting information including the setting item and the setting value.

When the selected-service storage unit 23 receives information indicating a user operation for selecting a desired service from the services installed in the image processing apparatus 10, from the operation receiving unit 21, the selected-service storage unit 23 stores information for specifying the selected service.

For each of the services installed in the image processing apparatus 10, the service-related-information storage unit 24 stores service-related information indicating a correspondence between the service and the setting items related to the service. The setting items related to a service refer to setting items to be set for use of the service. The service-related information will be described in detail below.

When a service is installed in the image processing apparatus 10, the service-related-information setting unit 25 obtains setting items related to the service from the setting items included in the common setting information stored in the common-setting-information storage unit 22, and sets service-related information indicating a correspondence between the service and the setting items, in the service-related-information storage unit 24. Determination as to which setting items among the setting items included in the common setting information are related to the service may be made by transmitting an inquiry to a user, or may be made on the basis of information associated with software for achieving the service.

The screen storage unit 26 stores various screens used by the display controller 28. In particular, the screen storage unit 26 stores the service selection screen for selecting a desired service from the services installed in the image processing apparatus 10. In the service selection screen, the buttons illustrated in FIG. 8 are not disposed. The screen storage unit 26 stores a setting screen for setting the common setting items in services. Buttons or the like representing setting items are disposed in a normal display manner in a setting screen.

When a setting item which does not need to be set is provided, the display manner changing unit 27 changes the display manner for the setting item into one with which the setting item is discriminated from a setting item which needs to be set. As a display manner for discriminating the setting item from one which needs to be set, various display manners may be used. For example, when a setting item which needs to be set is displayed in a normal color (for example, black), a display manner in which a setting item which does not need to be set is displayed in gray (in a grayed-out state) may be used. In this case, the normal color (for example, black) is an exemplary first manner, and gray (grayed-out state) is an exemplary second manner. Instead, when a setting item which needs to be set is normally displayed, a display manner in which a setting item which does not need to be set is not displayed may be used. Further, when a setting item which needs to be set is displayed so as to be settable, a display manner in which a setting item which does not need to be set is displayed so as not to be settable may be used. In the present exemplary embodiment, the first display manner is employed.

The display controller 28 exerts control so that screens and the like are displayed on the operation panel 15 (see FIG. 1). In particular, the display controller 28 exerts control so that the service selection screen stored in the screen storage unit 26 is displayed. When setting for a desired service is to be performed, the display controller 28 exerts control so that the setting screens stored in the screen storage unit 26 are displayed. At that time, the display controller 28 obtains setting items related to a service specified by the information stored in the selected-service storage unit 23, from the service-related-information storage unit 24. The display controller 28 controls the display manner changing unit 27 so that the display manner of setting items other than those obtained from the service-related-information storage unit 24 is changed. In the present exemplary embodiment, the display controller 28 is provided as an exemplary controller which exerts control so that display elements are displayed.

FIGS. 13A and 13B are diagrams illustrating exemplary service-related information stored in the service-related-information storage unit 24.

FIG. 13A illustrates exemplary service-related information including setting items related to each of the services. Specifically, to operate the service A, setting items, such as an SMTP server name/address, an SMTP server port number, a POP3 server name/address, and a POP3 server port number, need to be set.

As illustrated in FIG. 13B, the service-related information which includes setting items for each of the services in a format according to the screen classification may be stored. Specifically, to operate the service A, setting items, such as an SMTP server name/address, an SMTP server port number, a POP3 server name/address, and a POP3 server port number, need to be set in the classification of "SMTP" classified in the classification "protocol setting" whose higher classification is the "network setting".

Operations of Setting Support Device

When a service is installed in the image processing apparatus 10, the service-related-information setting unit 25 in the setting support device 20 illustrated in FIG. 12 obtains setting items related to the service from the setting items included in the common setting information stored in the common-setting-information storage unit 22, and sets service-related information indicating a correspondence between the service and the setting items related to the service, in the service-related-information storage unit 24.

Figure 14:
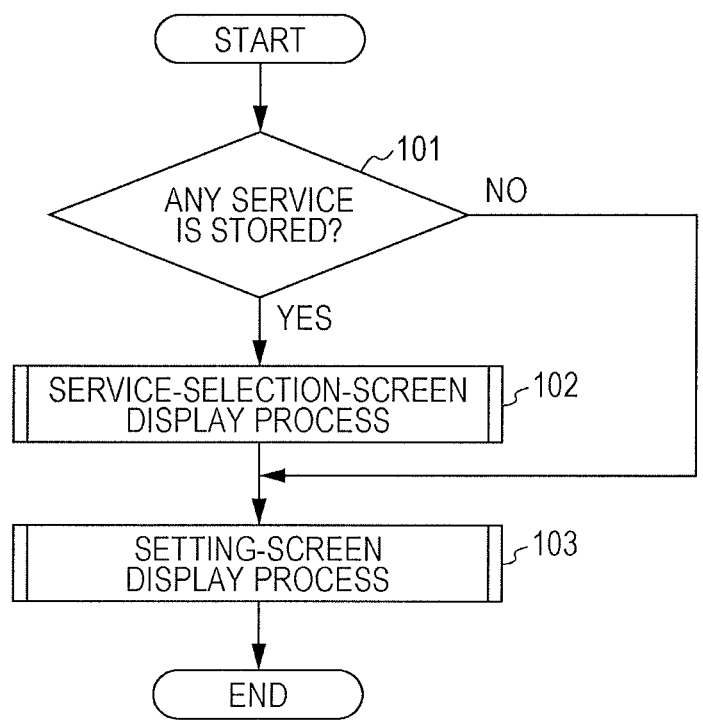
FIG. 14 is a flowchart of an exemplary operation of the setting support device according to the exemplary embodiment of the present invention.

FIG. 14 is a flowchart of an exemplary operation performed by the setting support device 20 when a user performs setting in this state. For example, by pressing the "specification setting" button on the menu screen illustrated in FIG. 3, this operation is started.

When the operation is started, the setting support device 20 determines whether or not any service is stored in the service-related-information storage unit 24, as illustrated in FIG. 14 (in step 101). That is, the setting support device 20 determines whether or not any service is installed in the image processing apparatus 10. Specifically, the display controller 28 refers to the service-related-information storage unit 24, thereby making such determination.

If the determination result is that some service is stored in the service-related-information storage unit 24, the setting support device 20 performs a process of displaying the service selection screen (in step 102). Thus, for example, the service selection screen illustrated in FIG. 8 is displayed on the operation panel 15 (see FIG. 1).

If the determination result is that no services are stored in the service-related-information storage unit 24, the setting support device 20 does not perform the process of displaying the service selection screen. Thus, the service selection screen is not displayed.

After that, the setting support device 20 performs a process of displaying a setting screen (in step 103). Thus, a setting screen, such as the specification setting screen in FIG. 4, the network setting screen in FIGS. 5 and 9, the protocol setting screen in FIGS. 6 and 10, or the SMTP setting screen in FIGS. 7 and 11, is displayed on the operation panel 15 (see FIG. 1). Specifically, the setting support device 20 displays setting screens, such as the specification setting screen, the network setting screen, the protocol setting screen, and the SMTP setting screen, in accordance with a setting type specified by a user.

Figure 15:
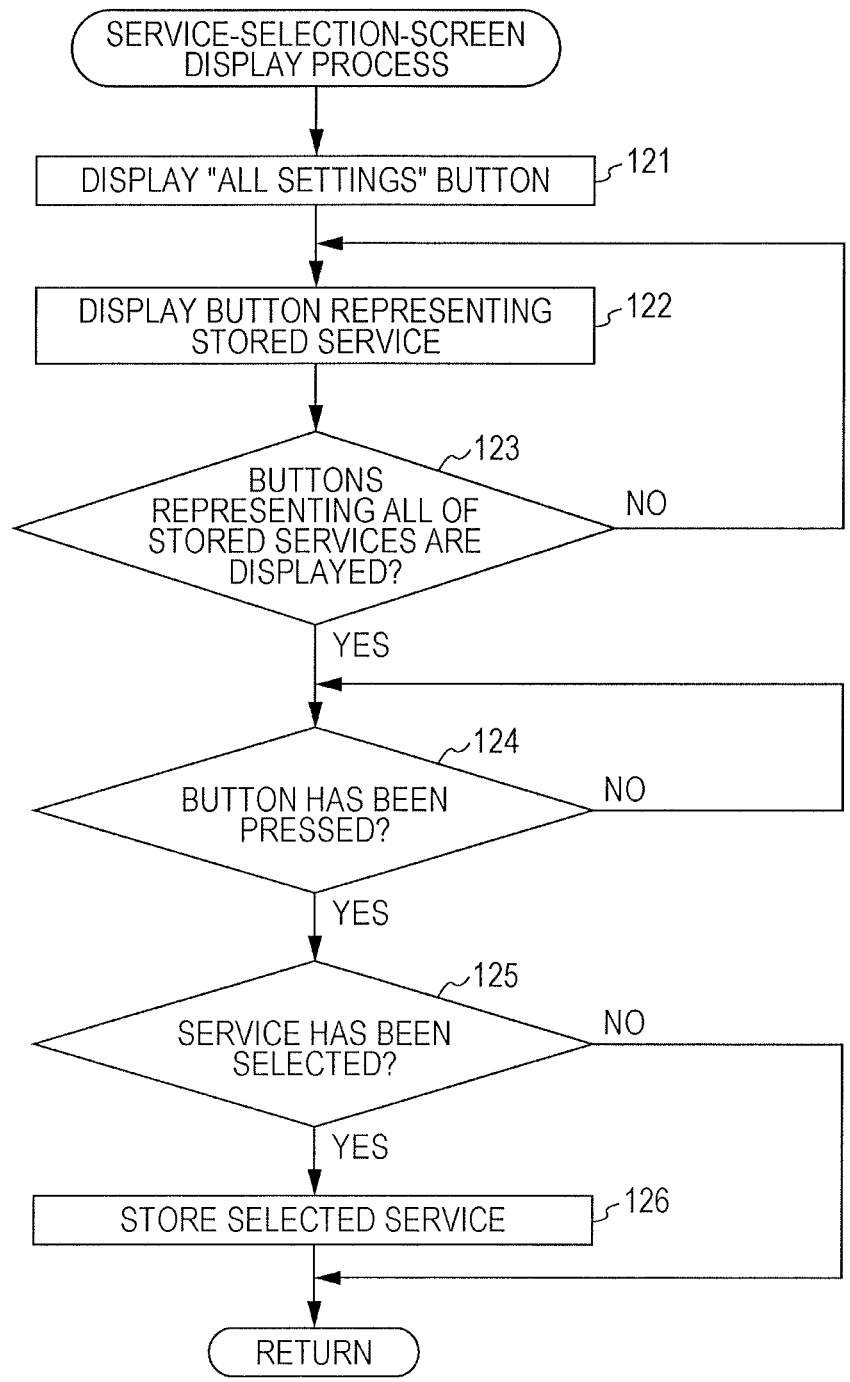
FIG. 15 is a flowchart of an exemplary operation performed by the setting support device when a service selection screen is to be displayed.

FIG. 15 is a flowchart of an exemplary operation performed by the setting support device 20 when the process of displaying the service selection screen in step 102 in FIG. 14 is performed. Prior to the operation, the display controller 28 has already obtained the service selection screen from the screen storage unit 26.

As illustrated in FIG. 15, the display controller 28 in the setting support device 20 disposes the "all settings" button on the service selection screen, and displays it on the operation panel 15 (in step 121). Then, the display controller 28 disposes a button representing a service stored in the service-related-information storage unit 24 in the service selection screen, and displays it on the operation panel 15 (in step 122). After that, the display controller 28 determines whether or not buttons representing all of the services stored in the service-related-information storage unit 24 are displayed (in step 123).

If the determination result is that buttons representing all of the services stored in the service-related-information storage unit 24 are not displayed, the display controller 28 returns the process back to step 122, disposes a button representing a next service stored in the service-related-information storage unit 24 on the service selection screen, and displays it on the operation panel 15. For example, when the service-related information in FIG. 13A is stored in the service-related-information storage unit 24, a button representing the service A is displayed in the first process, and a button representing the service B is displayed in the second process.

After that, if it is determined that buttons representing all of the services stored in the service-related-information storage unit 24 are displayed, the display controller 28 proceeds the process to step 124.

The process is transferred to the operation receiving unit 21, and the operation receiving unit 21 determines whether or not a user operation of pressing a button on the operation panel 15 has been performed (in step 124). If it is determined that a user operation of pressing a button has not been performed, the operation receiving unit 21 continues the determination in step 124. If it is determined that a user operation of pressing a button has been performed, the operation receiving unit 21 determines whether or not the user operation is one for selecting a service (in step 125).

If the determination result is that the user operation is one for selecting a service, the operation receiving unit 21 causes the selected-service storage unit 23 to store information specifying the selected service (in step 126), and returns the process back to FIG. 14. For example, when the "service A" button or the "service B" button is pressed on the service selection screen in FIG. 8, the selected-service storage unit 23 stores information specifying the service indicated by the pressed button.

If it is determined that the user operation is not one for selecting a service, the operation receiving unit 21 does not cause the selected-service storage unit 23 to store the information, and returns the process back to FIG. 14. For example, when the "all settings" button is pressed on the service selection screen in FIG. 8, the selected-service storage unit 23 does not store the information.

FIG. 16 is a flowchart of an exemplary operation performed by the setting support device 20 when the process of displaying a setting screen is performed in step 103 in FIG. 14. Prior to the operation, the display controller 28 has already obtained a setting screen for performing specified setting from the screen storage unit 26.

As illustrated in FIG. 16, the display controller 28 in the setting support device 20 determines whether or not the selected-service storage unit 23 stores the information specifying a service (in step 141). If the determination result is that the selected-service storage unit 23 does not store the information specifying a service, the display controller 28 displays the setting screen, as it is, in the normal color on the operation panel 15 (in step 142).

If it is determined that the selected-service storage unit 23 stores the information specifying a service, the display controller 28 determines whether or not a setting item included in the setting screen is stored in the service-related-information storage unit 24 as a setting item related to the service (in step 143). For example, when the service A is selected on the service selection screen in FIG. 8, the display controller 28 determines whether or not a setting item for the service A is stored in the service-related-information storage unit 24 in FIG. 13A.

If the determination result is that the setting item is stored in the service-related-information storage unit 24 as a setting item related to the service, the display controller 28 displays the setting item, as it is, in the normal color in the setting screen on the operation panel 15 (in step 144). If it is determined that the setting item is not stored in the service-related-information storage unit 24 as a setting item related to the service, the display controller 28 instructs the display manner changing unit 27 to change the color of the setting item into gray, and displays the setting item in gray in the setting screen on the operation panel 15 (in step 145). After that, the display controller 28 determines whether or not all of the setting items included in the setting screen are displayed (in step 146).

If the determination result is that all of the setting items included in the setting screen are not displayed, the display controller 28 returns the process back to step 143, and determines whether or not a next setting item included in the setting screen is stored in the service-related-information storage unit 24 as a setting item related to the service. For example, in the case where the SMTP setting screen in FIG. 11 is specified, when the service-related-information storage unit 24 stores the service-related information in FIG. 13A, the setting item "SMTP server name/address" is displayed in the first process, and the setting item "SMTP server port number" is displayed in the second process. After that, the setting items, "POP3 server name/address" and "POP3 server port number", included in the SMTP setting screen are sequentially processed.

After that, if it is determined that all of the setting items included in the setting screen are displayed, the display controller 28 returns the process back to FIG. 14.

Modified Exemplary Embodiment of Setting Support Device

In the present exemplary embodiment, on the precondition that the service-related-information storage unit 24 stores information about multiple services, the service selection screen is displayed so that one service is selected from the multiple services. The present invention is not limited to this. That is, when the service-related-information storage unit 24 stores information about only one service, display of the service selection screen may be skipped, and the selected-service storage unit 23 may store information specifying the only one service without any condition.

In the present exemplary embodiment, on the precondition that multiple services are installed in the image processing apparatus 10, the service selection screen is displayed so that one service is selected from the multiple services. The present invention is not limited to this. That is, when only one service is installed in the image processing apparatus 10, display of the service selection screen may be skipped, and the selected-service storage unit 23 may store information specifying the only one service without any condition.

In the present exemplary embodiment, the service-related-information storage unit 24 stores information about the services installed in the image processing apparatus 10. Therefore, the above-described two modified exemplary embodiments are equivalent. However, regardless of the services installed in the image processing apparatus 10, information about services specified by a user may be stored in the service-related-information storage unit 24. This makes the two above-described modified exemplary embodiments different from each other. That is, in the former modified exemplary embodiment, in the case where services specified by a user are displayed in the service selection screen by searching the service-related-information storage unit 24 and where only one service is present, display of the service selection screen may be skipped. In the latter modified exemplary embodiment, in the case where the services installed in the image processing apparatus 10 are displayed in the service selection screen by searching a management unit (not illustrated) which directly manages the services installed in the image processing apparatus 10 and where only one service is present, display of the service selection screen may be skipped.

In the present exemplary embodiment, when the service-related-information storage unit 24 stores information about multiple services, the service selection screen is displayed so that one service is selected from the multiple services. However, the present invention is not limited to this. That is, when the service-related-information storage unit 24 stores the same setting items for the multiple services as service-related setting items, display of the service selection screen may be skipped, and the stored setting items may be displayed so as to be discriminated from the other setting items.

In the present exemplary embodiment, when multiple services are installed in the image processing apparatus 10, the service selection screen is displayed so that one service is selected from the multiple services. However, the present invention is not limited to this. That is, when each of the multiple services has the same service-related setting items, display of the service selection screen may be skipped, and the setting items may be displayed so as to be discriminated from the other setting items.

In the present exemplary embodiment, the service-related-information storage unit 24 stores information about the services installed in the image processing apparatus 10. Therefore, the two above-described modified exemplary embodiments are equivalent. However, regardless of the services installed in the image processing apparatus 10, information about services specified by a user may be stored in the service-related-information storage unit 24. This makes the two above-described modified exemplary embodiments different from each other. That is, in the former modified exemplary embodiment, in the case where services specified by a user are displayed in the service selection screen by searching the service-related-information storage unit 24 and where setting items related to a service are the same as those related another service, display of the service selection screen may be skipped. In the latter modified exemplary embodiment, in the case where the services installed in the image processing apparatus 10 are displayed in the service selection screen by searching the management unit (not illustrated) which directly manages the services installed in the image processing apparatus 10 and where setting items related to a service are the same as those related to another service, display of the service selection screen may be skipped.

In the present exemplary embodiment, the common setting items in services are the target to be processed. Setting items specific to a service may be included in the target to be processed. Specifically, since a service is selected in the service selection screen in FIG. 8, setting items specific to the service may be also displayed in the hierarchized screens after the service selection screen. Thus, in a setting operation for the common setting items in services, setting items specific to a service may be also set.

Setting items for use of a service may be classified into required items and optional items, which is not taken into consideration in the present exemplary embodiment. In this case, a way of storing required items and optional items for each of the services in such a manner that the required items are discriminated from the optional items may be employed. Such a way may be, for example, one in which, for each of the setting items in the service-related-information storage unit 24, a column indicating whether the setting item is a required item or an optional item is provided. When the setting item is to be displayed, the display manner changing unit 27 may use a display manner according to whether the setting item is a required item or an optional item (for example, by using a changed display color).

An appropriate range of the setting value for a common setting item in services may depend on a service, which is not taken into consideration in the present exemplary embodiment. In this case, to make the range of the settable setting value changeable, a way of storing, for each of the services, a range of the setting value for a setting item related to the service may be employed. Such a way may be, for example, one in which a column indicating the range of a setting value is provided for each setting item in the service-related-information storage unit 24. When a setting value is set, whether or not the setting value is within the range is checked on the basis of the column. If the setting value is out of the range, warning is issued. For example, assume that an appropriate setting value for a certain setting item ranges between 1 and 5 for the service A, whereas it ranges between 3 and 7 for the service B. In this case, when 6 is set for the service A, warning is issued and the setting is not allowed, whereas, when 6 is set for the service B, the setting is allowed.

As described above, in the case where an appropriate range for the setting value of a common setting item in services depends on a service, setting may be performed especially by selecting an option. In this case, to allow options for the setting item to be changed depending on a service, a way of storing options for the setting item for each service may be employed. By using this, the options may be displayed when setting is to be performed. For example, assume that options for a certain setting item are an option a, an option b, and an option c for the service A, whereas the options are an option c, an option d, and an option e for the service B. In this case, when setting is to be performed for the service A, the option a, the option b, and the option c are displayed, and one option is selected from these options and set. When setting is to be performed for the service B, the option c, the option d, and the option e are displayed, and one option is selected from these options and set.

The programs for achieving the present exemplary embodiment may be provided through a communication unit, and may be provided by storing the programs in a recording medium such as a compact disc-read-only memory (CD-ROM).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
 a display configured to display a setting screen comprising display elements representing setting items;

a controller configured to control the display to, in response to a service not having been installed in the information processing apparatus, display, in a first manner, elements concerning common setting items that are common among services, wherein the controller is configured to control the display to, in response to the service having been installed in the information processing apparatus, display a service selection screen for receiving a selection operation selecting a display element from among display elements comprising:
- a first display element corresponding to the service; and
- a second display element for enabling all of the setting items to be set regardless of installed services of the information processing apparatus, wherein the controller is configured to control, in response to the first display element being selected, the display to display, in a second manner different from the first manner, an element concerning a setting item that is not set for use for the service, and wherein the controller is configured to control, in response to the second display element being selected, the display to display in the first manner the element concerning the setting item that is not set for use for the service.

2. The information processing apparatus according to claim 1, wherein the controller is configured to control the display to display in the first manner, in response to the first display element being selected, an element concerning a setting item that is necessary for operation of the service.

3. The information processing apparatus according to claim 2, wherein the controller is configured to control the display to display the element concerning the setting item that is not set for use for the service on a same screen as the element concerning the setting item that is necessary for operation of the service.

4. The information processing apparatus according to claim 1, wherein the setting item that is not set for use for the service is not necessary for operation of the service.

* * * * *